United States Patent
Nieczyporowicz et al.

(10) Patent No.: US 7,099,372 B2
(45) Date of Patent: Aug. 29, 2006

(54) SPREADING CODE HOPPING FOR SYNCHRONOUS DS-CDMA SYSTEM TO MITIGATE INTERFERENCE EFFECTS

(75) Inventors: Leon L. Nieczyporowicz, Allen, TX (US); Richard B. Ertel, Midvale, UT (US); Thomas R. Giallorenzi, Riverton, UT (US); Eric K. Hall, Holliday, UT (US)

(73) Assignee: L-3 Communications Corporation, New York, NY (US)

( * ) Notice: Subject to any disclaimer, the term of this patent is extended or adjusted under 35 U.S.C. 154(b) by 805 days.

(21) Appl. No.: 10/037,422

(22) Filed: Oct. 24, 2001

(65) Prior Publication Data
US 2002/0097703 A1    Jul. 25, 2002

Related U.S. Application Data

(60) Provisional application No. 60/243,808, filed on Oct. 27, 2000.

(51) Int. Cl.
  *H04B 1/707* (2006.01)
(52) U.S. Cl. .................................................. 375/140
(58) Field of Classification Search ................ 375/132, 375/140, 146–148, 260, 285, 295, 316; 370/320, 370/335, 342, 441; 455/39, 463, 464
See application file for complete search history.

(56) References Cited

U.S. PATENT DOCUMENTS

| | | | | |
|---|---|---|---|---|
| 5,432,814 A | * | 7/1995 | Hasegawa | 375/133 |
| 5,583,853 A | | 12/1996 | Giallorenzi et al. | 370/441 |
| 5,751,761 A | | 5/1998 | Gilhousen | 375/200 |
| 5,774,808 A | * | 6/1998 | Sarkioja et al. | 455/436 |
| 5,815,526 A | | 9/1998 | Rice | 375/206 |

(Continued)

OTHER PUBLICATIONS

"Code Hopping as a New Strategy to Improve Performance of S-CDMA Cellular Systems", B. Unal. et. al., Proc. IEEE Global Telecommunications Conf., 1996, pp. 1316-1319.

(Continued)

*Primary Examiner*—Khanh Tran
(74) *Attorney, Agent, or Firm*—Harrington & Smith, LLP

(57) ABSTRACT

Disclosed is a method for operating a code division multiple access communications system, and a system that operates in accordance with the method. The method operates within a coverage area of a base station by assigning a set of spreading codes to individual ones of a plurality of subscriber stations and then, during transmissions within the cell, by periodically hopping amongst spreading code within the set of spreading codes such that at any given time no two subscriber stations operate with the same spreading code. The set of spreading codes may include the all one's spreading code. The step of periodically hopping preferably changes from a currently used spreading code to a next spreading code at a symbol rate or at a multiple of the symbol rate. The set of spreading codes may be a hopped sub-set of a larger set of spreading codes, and in this case the method further operates to assign a non-hopped sub-set of the larger set of spreading codes to individual ones of the plurality of subscriber stations for use on a system access channel and/or on a system control channel or, more generally, for use on a non-traffic channel. The system may be a fixed data rate system or a variable data rate system. In the latter case the step of periodically hopping may change from a currently used spreading code to a next spreading code at the symbol rate, or at a multiple of the symbol rate of the lowest or the highest symbol rate users.

18 Claims, 5 Drawing Sheets

PHY REFERENCE MODEL SHOWING DATA FLOW

U.S. PATENT DOCUMENTS

| | | |
|---|---|---|
| 5,966,373 A | 10/1999 | Stephenson et al. ........ 370/335 |
| 6,023,462 A | 2/2000 | Nieczyporowicz et al. . 370/335 |
| 6,061,339 A | 5/2000 | Nieczyporowicz et al. . 370/335 |
| 6,108,369 A * | 8/2000 | Ovesjo et al. .............. 375/146 |
| 6,112,094 A * | 8/2000 | Dent ....................... 455/452.1 |
| 6,163,524 A * | 12/2000 | Magnusson et al. ........ 370/208 |
| 6,377,606 B1 * | 4/2002 | Toskala et al. ............. 375/130 |
| 6,577,671 B1 * | 6/2003 | Vimpari ..................... 375/146 |
| 6,760,317 B1 * | 7/2004 | Honkanen et al. .......... 370/329 |
| 6,795,689 B1 * | 9/2004 | Ogren et al. ............. 455/67.13 |

OTHER PUBLICATIONS

"Variability of User Performance in Cellular DS-CDMA-Long Versus Short Spreading Sequences", S. Parkvall, IEEE Transactions on Communications, vol. 48, No. 7, Jul. 2000.

* cited by examiner

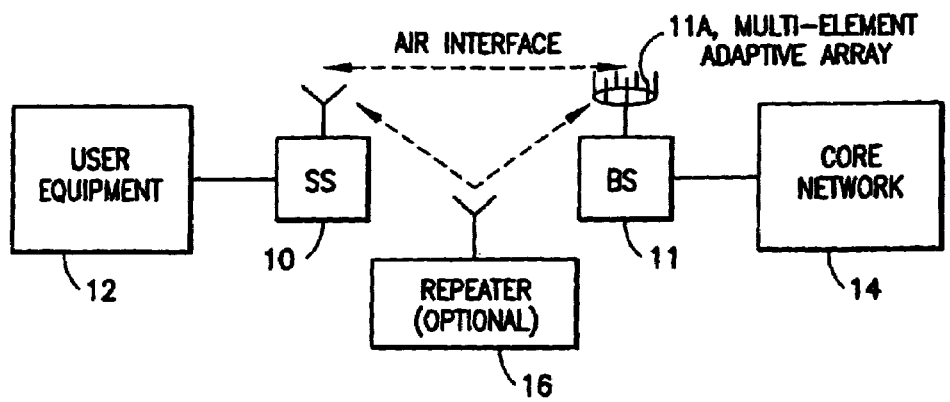
FIG. 1  WIRELESS ACCESS REFERENCE MODEL
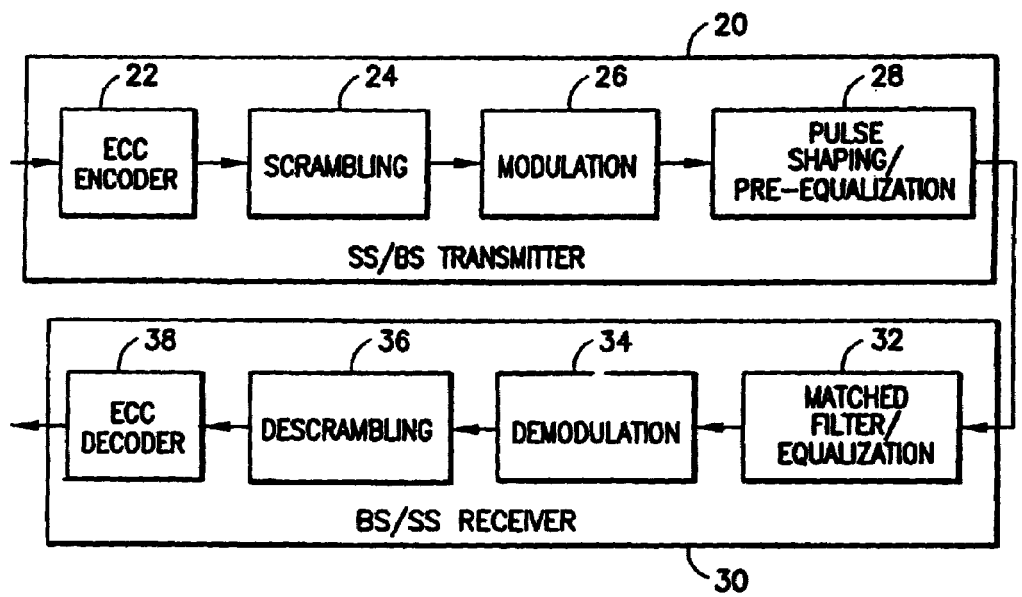
FIG 2  PHY REFERENCE MODEL SHOWING DATA FLOW
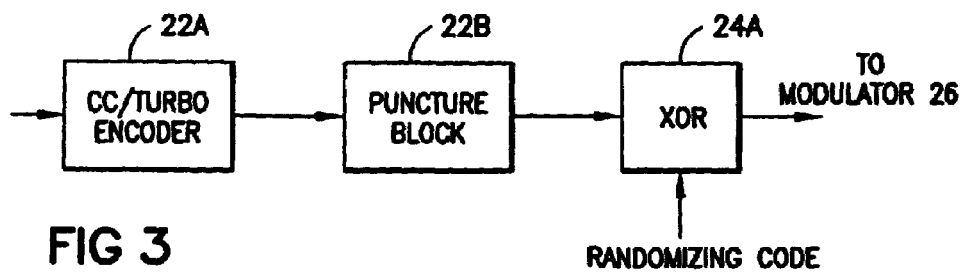
FIG 3

| PARAMETER | MODULATION AND CHANNEL CODING | | |
|---|---|---|---|
| | QPSK w/R=4/5 CODING (1.6 BITS/SYM) | 16-QAM w/R=4/5 CODING (3.2 BITS/SYM) | 64-QAM w/R=4/5 CODING (4.8 BITS/SYM) |
| RF CHANNEL BANDWIDTH | 3.5 MHz | 3.5 MHz | 3.5 MHz |
| CHIP RATE | 2.56 Mcps | 2.56 Mcps | 2.56 Mcps |
| COMMUNICATION CHANNEL BANDWIDTH | 4.096 Mbps | 8.192 Mbps | 12.288 Mbps |
| PEAK DATA RATE | 4.096 Mbps | 8.192 Mbps | 12.288 Mbps |
| CDMA CHANNEL BANDWIDTH (SF=1) | 4.096 Mbps | 8.192 Mbps | 12.288 Mbps |
| CDMA CHANNEL BANDWIDTH (SF=16) | 256 kbps | 512 kbps | 768 kbps |
| CDMA CHANNEL BANDWIDTH (SF=128) | 32 kbps | 64 kbps | 96 kbps |
| MODULATION FACTOR | 1.17 bps/Hz | 2.34 bps/Hz | 3.511 bps/Hz |

FIG.4  HYPOTHETICAL PARAMETERS FOR A 3.5 MHz RF CHANNELIZATION

| NUMBER OF ELEMENTS | QPSK | | 16 QAM | | 64 QAM | |
|---|---|---|---|---|---|---|
| | AGGREGATE CAPACITY (Mbps) | MODULATION FACTOR | AGGREGATE CAPACITY (Mbps) | MODULATION FACTOR | AGGREGATE CAPACITY (Mbps) | MODULATION FACTOR |
| 1 | 4.096 | 1.17 | 8.192 | 2.34 | 12.288 | 3.511 |
| 2 | 8.192 | 2.34 | 16.384 | 4.68 | 24.576 | 7.022 |
| 4 | 16.384 | 4.68 | 32.768 | 9.36 | 49.152 | 14.044 |
| 8 | 32.768 | 9.36 | 65.536 | 18.72 | 98.304 | 28.088 |
| 16 | 65.536 | 18.72 | 131.072 | 37.44 | 196.608 | 56.176 |

FIG.5  AGGREGATE CAPACITY AND MODULATION FACTORS VERSUS MODULATION TYPE AND ARRAY SIZE

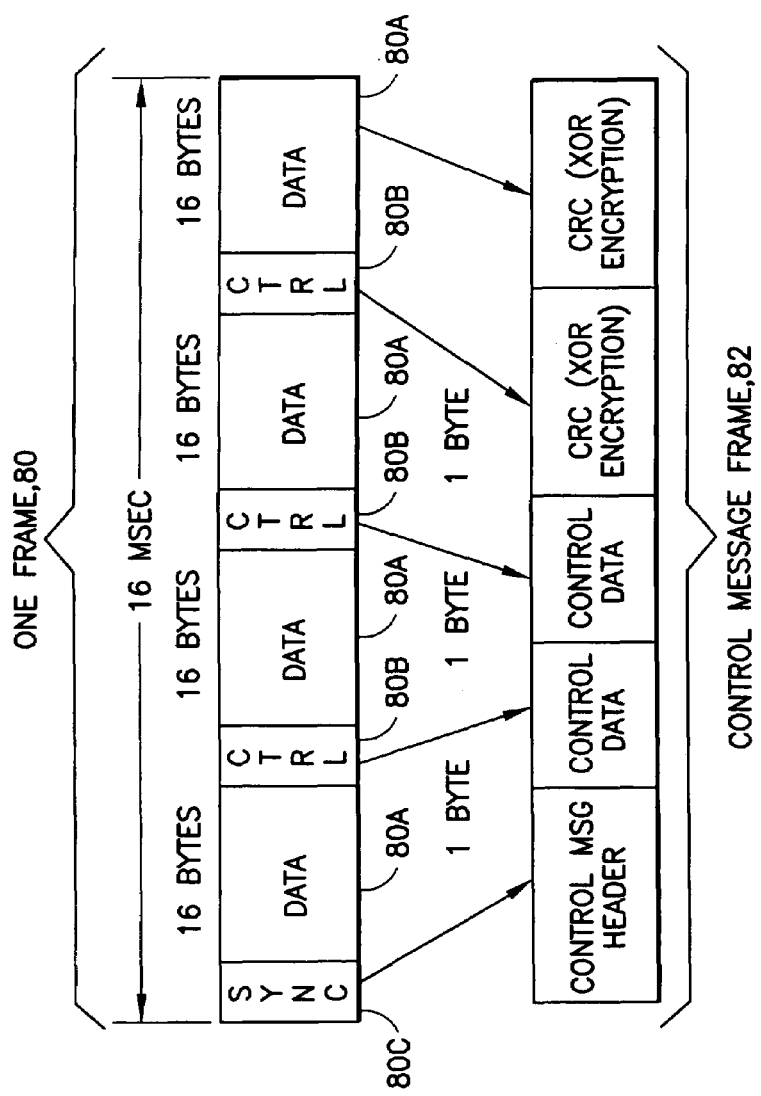

SPREADING CODE HOPPING FOR SYNCHRONOUS DS-CDMA SYSTEM TO MITIGATE INTERFERENCE EFFECTS

CLAIM OF PRIORITY FROM COPENDING PROVISIONAL PATENT APPLICATION

This patent application claims priority from U.S. Provisional Patent Application No. 60/243,808, filed on Oct. 27, 2000, the disclosure of which is incorporated by reference herein in its entirety.

FIELD OF THE INVENTION

These teachings relate generally to wireless communications systems and methods, and relate in particular to techniques for operating with pseudo-noise (PN) spreading codes in a Synchronous Code Division Multiple Access (S-CDMA) system.

BACKGROUND OF THE INVENTION

In a synchronous direct-sequence code division multiple access (S-CDMA) system, users communicate simultaneously using the same frequency band via orthogonal modulation or spread spectrum. The number of orthogonal spreading codes (>1) establishes the maximum capacity of the system.

In a fixed wireless loop (FWL) S-CDMA system the chipping rate may be held constant to maintain the orthogonality of the PN codes. This implies that for higher data rates the processing gain (PG) is reduced. When the processing gain is reduced, it may become difficult or even impossible to design the short PN codes such that, for some data patterns and offsets, the adjacent cell PN codes are not highly correlated, or even perfectly correlated if the PG becomes sufficiently small.

Related to the foregoing, it is further noted that a common method to increase the data rate of a DS-CDMA system operating with a fixed chipping rate is to implement variable rate spreading codes. In this approach just a few chips modulate the each symbol in order to increase the effective symbol rate. As the spreading gain decreases, the design of the code sets having good cross-correlation properties with other code sets becomes more difficult. In cellular deployments, adjacent cells using a common frequency band must have code sets that have low cross-correlation values in order to minimize adjacent channel interference. For spreading gains on the order of 8 or 16 chips/symbol, code sets exhibiting low cross-correlation properties are very difficult to design.

This problem can be especially troublesome if the base stations, also referred to as radio base units (RBUs), are semi-synchronized, that is, if one base station maintains the same relative timing offset to other base stations. In this case if a subscriber system or unit, which may be simply referred to as a user, is operating with a PN code with high interference, the user could remain in the high interference condition and experience a much reduced signal to noise ratio (SNR) until the interferor's or the user's transmission is terminated.

Conventional orthogonal DS-CDMA systems that use a cover code, i.e., a code that is used to scramble individual codes of a code set), typically require that all CDMA channels, including control and random access channels, must use the cover code. This can cause problems, as when a long cover code is used on a random access channel, new users may require a significant amount of time to acquire the system as the phase of the cover code must be recovered. Reference with regard to the use of a cover code can be had to U.S. Pat. No. 5,751,761 by Gilhousen.

However, the use of cover codes constructed using long period linear feedback shift registers (LFSR) results in unbalanced spreading codes. For example, and referring to FIG. 6, orthogonal code sets constructed using well-known Walsh-Hadamard matrices may have P−1 balanced codes and one completely unbalanced code, typically referred to as the all one's code. In the illustrated 4×4 Walsh-Hadamard matrix there are three balanced codes (equal numbers of plus and minus codes) and the unbalanced all one's code. Without a cover code, the all one's code would be unused due to DC bias problems and large correlation with adjacent cell codes. The omission of the all one's code thus serves to reduce the capacity (i.e., the number of allowable active users) in a cell.

One technique for mitigating interference between users is disclosed in commonly assigned U.S. Pat. No. 6,023,462, Fixed Wireless Loop System that Ranks Non-Assigned PN Codes to Reduce Interference, by L. L. Nieczyporowicz, P. L. Stephenson, T. R. Giallorenzi and R. W. Steagall, the disclosure of which is incorporated by reference herein in its entirety.

SUMMARY OF THE INVENTION

In accordance with these teachings, the foregoing and other problems are overcome when users in a DS-CDMA system exchange or hop between spreading codes during transmission on a regular basis, such as on a block (group of symbols) basis, or a symbol-by-symbol basis. This technique, referred to herein as PN code hopping, is applicable to both fixed rate and variable rate DS-CDMA systems, and improves performance of all such systems. The use of PN code hopping has the effect of randomizing a set of PN codes, without incurring the disadvantages inherent in the use of a cover code, for the mitigation of adjacent cell interference. This becomes especially important when small spreading gains are used (e.g., P<16 chips/symbol), since the design of code sets with such small spreading gain is difficult when attempting to minimize cross-correlation between adjacent cell code sets. Somewhat similar to the manner in which cover codes operate to scramble the spreading codes in adjacent cells, code hopping results in an averaging of the interference over the population of users in a given cell. Significantly, no one single user suffers a long period of severe signal degradation due to the effects of adjacent cell interference. In the preferred embodiment of these teachings adjacent cells use different code sets and different hopping patterns.

PN code hopping in accordance with the teachings of this invention provides several advantages over the use of conventional cover codes when mitigating adjacent cell interference. First, PN code hopping has a simple hardware implementation that uses a memory and mechanism, such as a finite state machine (FSM), to generate the hopping pattern. Secondly, as was discussed above the orthogonal DS-CDMA systems that use cover codes require that all CDMA channels, including control and random access channels, use the cover code. In accordance with an aspect of the PN code hopping technique of this invention, the PN codes used for random access and control channels can be omitted from the hopping sequence, enabling these non-hopped codes to be more rapidly acquired. Thirdly, PN code hopping preserves the balance in a code set, unlike long cover codes which tend to unbalance a balanced code set. The use of balanced codes in an orthogonal DS-CDMA system can be important, since they prevent the occurrence of DC biasing problems in the receiver. Fourthly, by the use of PN code hopping in accordance with this invention the all one's code can be used, provided that it is a member of the set of hopped PN codes. In that a given user operates with the all one's code for a short period of time, such as the duration of one symbol or some multiple of a symbol period, the potential signal degradation due to adjacent cell interference and the DC biasing problems will be sporadic, and can easily be corrected using conventional error control techniques. Reclaiming the all one's code in a synchronous DS-CDMA system with a fixed spreading gain P increase the system capacity by 1/P−1 percent. The use of PN code hopping thus increases both the robustness and the capacity of a DS-CDMA system.

Disclosed is a method for operating a code division multiple access communications system, and a system that operates in accordance with the method. The method operates within a coverage area of a base station by assigning a set of spreading codes to individual ones of a plurality of subscriber stations and then, during transmissions within the cell, by periodically hopping amongst spreading code within the set of spreading codes such that at any given time no two subscriber stations operate with the same spreading code. The set of spreading codes may include the all one's spreading code. The step of periodically hopping preferably changes from a currently used spreading code to a next spreading code at a symbol rate or at a multiple of the symbol rate.

The set of spreading codes may be a hopped sub-set of a larger set of spreading codes, and in this case the method further operates to assign a non-hopped sub-set of the larger set of spreading codes to individual ones of the plurality of subscriber stations for use on a system access channel and/or on a system control channel or, more generally, for use on a non-traffic channel.

The system may be a fixed data rate system or a variable data rate system. In the latter case the step of periodically hopping may change from a currently used spreading code to a next spreading code at the symbol rate, or at a multiple of the symbol rate of the lowest or the highest symbol rate users.

BRIEF DESCRIPTION OF THE DRAWINGS

The above set forth and other features of these teachings are made more apparent in the ensuing Detailed Description of the Preferred Embodiments when read in conjunction with the attached Drawings, wherein:

FIG. 1 is simplified block diagram of a wireless access reference model that pertains to these teachings;

FIG. 2 is block diagram of a physical (PHY) system reference model showing a major data flow path;

FIG. 3 shows an Error Control Coding (ECC) and scrambling technique for single CDMA channel;

FIG. 4 is a Table illustrating exemplary parameters for a 3.5 MHz RF channelization;

FIG. 5 is a Table depicting an aggregate capacity and modulation factors versus modulation type and antenna array size (number of elements);

FIG. 6 illustrates a conventional 4×4 Walsh-Hadamard matrix having three balanced codes (equal numbers of plus and minus codes) and an unbalanced all one's code;

FIG. 7 illustrates a conventional frame structure that is suitable for practicing this invention;

DETAILED DESCRIPTION OF THE PREFERRED EMBODIMENTS

Figure 8:
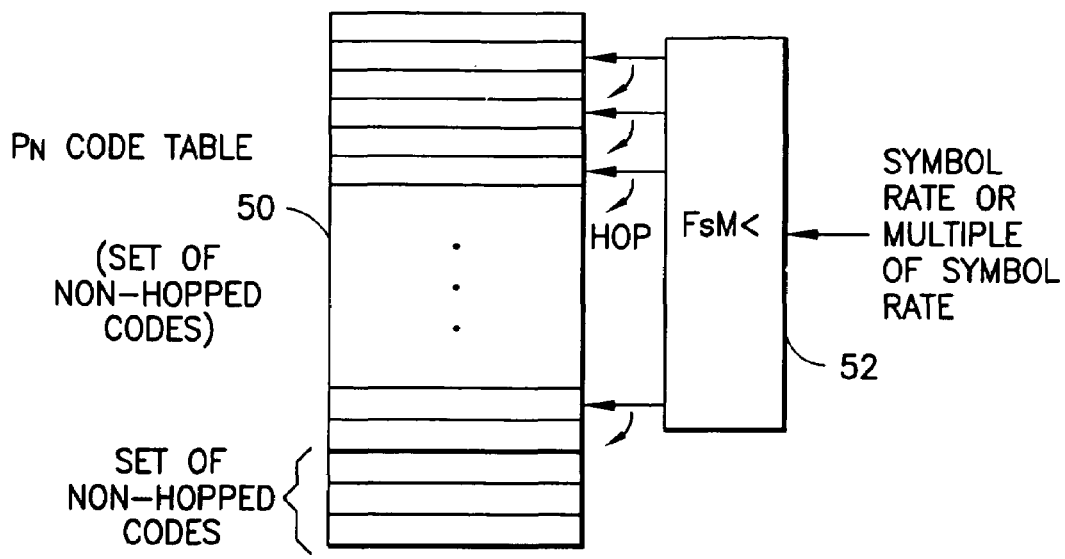
FIG. 8 shows a PN code table with different users indexed into the table and offset from one another, wherein the users' indices into the table are moved in unison so as to hop from code to code, with each user within the cell operating for a predetermined period of time with a different spreading code.

Disclosed herein is a physical (PHY) system intended for IEEE 802.16 and related standards, although those having skill in the art should realize that various aspects of these teachings have wider applicability. The PHY system is one suitable for implementing the teachings of this invention, although other types of CDMA systems may be used as well.

The technique is based on ahybrid synchronous DS-CDMA (S-CDMA) and FDMA scheme using quadrature amplitude modulation (QAM) and trellis coding. For a general background and benefits of S-CDMA with trellis-coded QAM one may refer to R. De Gaudenzi, C. Elia and R. Viola, Bandlimited Quasi-Synchronous CDMA: A Novel Satellite Access Technique for Mobile and Personal Communication Systems, IEEE Journal on Selected Areas in Communications, Vol. 10, No. 2, February 1992, pp. 328–343, and to R. De Gaudenzi and F. Gianneti, Analysis and Performance Evaluation of Synchronous Trellis-Coded CDMA for Satellite Applications, IEEE Transactions on Communications, Vol. 43, No. 2/3/4, February/March/April 1995, pp. 1400–1409.

The ensuing description focuses on a frequency division duplexing (FDD) mode. While a time division duplexing (TDD) mode is also within the scope of these teachings, the TDD mode is not discussed further.

What follows is an overview of the PHY teachings that are useful in gaining a fuller understanding of the teachings of this invention.

The system provides synchronous direct-sequence code division multiple access (DS-CDMA) for both upstream and downstream transmissions. The system further provides spread RF channel bandwidths from 1.75–7 MHz, depending on target frequency band, and a constant chip rate from 1–6 Mcps (Million chips per second)within each RF sub-channel with common I-Q spreading. The chip rate depends on channelization of interest (e.g. 3.5 MHz or 6 MHz). The system features orthogonal, variable-length spreading codes using Walsh-Hadamard designs with spread factors (SF) of 1, 2, 4, 8, 16, 32, 64 and 128 chips/symbol being supported, and also features unique spreading code sets for adjacent, same-frequency cells/sectors. Upstream and downstream power control and upstream link timing control are provided, as are single CDMA channel data rates from 32 kbps up to 16 Mbps depending on SF (spreading factor) and chip rate. In the preferred system SCDMA channel aggregation is provided for the highest data rates.

Furthermore, in the presently preferred embodiment FDMA is employed for large bandwidth allocations with S-CDMA in each FDMA sub-channel, and S-CDMA/FDMA channel aggregation is used for the higher data rates. Code, frequency and/or time division multiplexing is employed for both upstream and downstream transmissions. Frequency division duplex (FDD) or time division duplex (TDD) can be employed, although as stated above the TDD mode of operation is not described further. The system features coherent QPSK and 16-QAM modulation with optional support for 64-QAM. End-to-end raised-cosine Nyquist pulse shape filtering is employed, as is adaptive coding, using high-rate punctured, convolutional coding (K=7) and/or Turbo coding (rates of ⅘, ⅚ and ⅞ are typical). Data randomization using spreading code sequences is employed, as is linear equalization in the downstream with possible transmit pre-equalization for the upstream.

As will be described more fully below, also featured is the use of space division multiple access (SDMA) using adaptive beam-forming antenna arrays (e.g., 1 to 16 elements) at the base station.

FIG. 1 shows the wireless access reference model per the IEEE 802.16 FRD (see IEEE 802.16-00/02r4, Functional Requirements for the 802.16.3 Interoperability Standard.). Within this model, the PHY technique in accordance with these teachings provides access between one or more subscriber stations (SS) 10 and base stations (BS) 11 to support the user equipment 12 and core network 14 interface requirements. An optional repeater 16 may be deployed. In the preferred embodiment the BS 11 includes a multi-element adaptive array antenna 11 A, as will be described in detail below.

In FIG. 2, the PHY reference model is shown. This reference model is useful in discussing the various aspects of the PHY technique. As is apparent, the SS 10 and BS 11 transmission and reception equipment may be symmetrical. In a transmitter 20 of the BS 11 or the SS 10 there is an Error Control Coding (ECC) encoder 22 for incoming data, followed by a scrambling block 24, a modulation block 26 and a pulse shaping/pre-equalization block 28. In a receiver 30 of the BS 11 or the SS 10 there is a matched filter/equalization block 32, a demodulation block 34, a descrambling block 36 and an ECC decoder 38. These various components are discussed in further detail below.

The PHY interfaces with the Media Access Control (MAC) layer, carrying MAC packets and enabling MAC functions based on Quality of Service (QoS) requirements and Service Level Agreements (SLAs). As a S-CDMA system, the PHY interacts with the MAC for purposes of power and timing control. Both power and timing control originate from the BS 11, with feedback from the SS 10 needed for forward link power control. The PHY also interacts with the MAC for link adaptation (e.g. bandwidth allocation and SLAs), allowing adaptation of modulation formats, coding, data multiplexing, etc.

With regard to frequency bands and RF channel bandwidths, the primary frequency bands of interest for the PHY include the ETSI frequency bands from 1–3 GHz and 3–11 GHz as described in ETSI EN 301 055, Fixed Radio Systems; Point-to-multipoint equipment; Direct Sequence Code Division Multiple Access (DS-CDMA); Point-to-point digital radio in frequency bands in the range 1 GHz to 3 GHz, and in ETSI EN 301 124, Transmission and Multiplexing (TM); Digital Radio Relay Systems (DRRS); Direct Sequence Code Division Multiple Access (DS-CDMA) point-to-multipoint DRRS in frequency bands in the range 3 GHz to 11 GHz, as well as with the MMDS/MDS (digital TV) frequency bands. In ETSI EN 301 124, the radio specifications for DS-CDMA systems in the fixed frequency bands around 1.5, 2.2, 2.4 and 2.6 GHz are given, allowing channelizations of 3.5, 7, 10.5 and 14 MHz. Here, the Frequency Division Duplex (FDD) separation is specific to the center frequency and ranges from 54 to 175 MHz. In ETSI EN 301 124, Transmission and Multiplexing (TM); Digital Radio Relay Systems (DRRS); Direct Sequence Code Division Multiple Access (DS-CDMA) point-to-multipoint DRRS in frequency bands in the range 3 GHz to 11 GHz., the radio characteristics of DS-CDMA systems with fixed frequency bands centered around 3.5, 3.7 and 10.2 GHz are specified, allowing channelizations of 3.5, 7, 14, 5, 10 and 15 MHz. Here, FDD separation is frequency band dependant and ranges from 50 to 200 MHz. Also of interest to these teachings are the MMDS/ITSF frequency bands between 2.5 and 2.7 GHz with 6 MHz channelizations.

With regard to multiple access, duplexing and multiplexing, the teachings herein provide a frequency division duplex (FDD) PHY using a hybrid S-CDMA/FDMA multiple access scheme with SDMA for increased spectral efficiency. In this approach, a FDMA sub-channel has an RF channel bandwidth from 1.75 to 7 MHz. The choice of FDMA sub-channel RF channel bandwidth is dependent on the frequency band of interest, with 3.5 MHz and 6 MHz being typical per the IEEE 802.16 FRD. Within each FDMA sub-channel, S-CDMA is used with those users transmitting in the upstream and downstream using a constant chipping rate from 1 to 6 Mchips/second. While TDD could be used in a single RF sub-channel, this discussion is focused on the FDD mode of operation. Here, FDMA sub-channel(s) are used in the downstream while at least one FDMA sub-channel is required for the upstream. The approach is flexible to asymmetric data traffic, allowing more downstream FDMA sub-channels than upstream FDMA sub-channels when traffic patterns and frequency allocation warrant. Based on existing frequency bands, typical upstream/downstream FDMA channel separation range from 50 to 200 MHz.

Turning now to the Synchronous DS-CDMA (S-DS/CDMA) aspects of these teachings, within each FDMA sub-channel, S-CDMA is used in both the upstream and the downstream directions. The chipping rate is constant for all SS with rates ranging from 1 to 6 Mchips/second depending on the FDMA RF channel bandwidth. Common I-Q spreading is performed using orthogonal, variable-length spreading codes based on Walsh-Hadamard designs, with spread factors ranging from 1 up to 128 chips per symbol (see, for example, E. Dinan and G. Jabbari, Spreading Codes for Direct Sequence CDMA and Wideband CDMA Cellular Networks, IEEE Communications Magazine, September 1998, pp. 48–54. For multi-cell deployments with low frequency reuse, unique spreading code sets are used in adjacent cells to minimize interference.

An aspect of the preferred system embodiment is a symmetric waveform within each FDMA sub-channel, where both the upstream and downstream utilize the same chipping rate (and RF channel bandwidth), spreading code sets, modulation, channel coding, pulse shape filtering, etc.

Referring now to Code and Time Division Multiplexing and channel aggregation, with a hybrid S-CDMA/FDMA system it is possible to multiplex data over codes and frequency sub-channels. Furthermore, for a given code or frequency channel, time division multiplexing could also be employed. In the preferred approach, the following multiplexing scheme is employed.

For the downstream transmission with a single FDMA sub-channel, the channel bandwidth (i.e. capacity measured in bits/second) is partitioned into a single TDM pipe and multiple CDM pipes. The TDM pipe may be created via the aggregation of multiple S-CDMA channels. The purpose of this partition is based on the desire to provide Quality of Service (QoS). Within the bandwidth partition, the TDM pipe would be used for best effort service (BES) and for some assured forwarding (AF) traffic. The CDM channels would be used for expedited forwarding (EF) services, such as VoIP connections or other stream applications, where the data rate of the CDM channel is matched to the bandwidth requirement of the service.

The downlink could be configured as a single TDM pipe. In this case a time slot assignment may be employed for bandwidth reservation, with typical slot sizes ranging from 4–16 ms in length. While a pure TDM downlink is possible in this approach, it is preferred instead to employ a mixed TDM/CDM approach. This is so because long packets can induce jitter into EF services in a pure TDM link. Having CDMA channels (single or aggregated) dedicated to a single EF service (or user) reduces jitter without the need for packet fragmentation and reassembly. Furthermore, these essentially circuit-switched CDM channels would enable better support of legacy circuit-switched voice communications equipment and public switched telephone networks.

For the upstream, the preferred embodiment employs a similar partition of TDM/CDM channels. The TDM channel (s) are used for random access, using a slotted-Aloha protocol. In keeping with a symmetric waveform, recommended burst lengths are on the order of the slot times for the downlink, ranging from 4–16 ms. Multi-slot bursts are possible. The BS 11 monitors bursts from the SS 10 and allocates CDMA channels to SSs upon recognition of impending bandwidth requirements or based on service level agreements (SLAs). As an example, a BS 11 recognizing the initiation of a VoIP connection could move the transmission to a dedicated CDMA channel with a channel bandwidth of 32 kbps.

When multiple FDMA sub-channels are present in the upstream or downstream directions, similar partitioning could be used. Here, additional bandwidth exists which implies that more channel aggregation is possible. With a single TDM channel, data may be multiplexed across CDMA codes and across frequency sub-channels.

With regard now to Space Division Multiple Access (SDMA) extensions, a further aspect of this multiple access scheme involves the use of SDMA using adaptive beamforming antennas. Reference can be made to J. Liberti and T. Rappaport, *Smart Antennas for Wireless CDMA*, Prentice-Hall PTR, Upper Saddle River, N.J., 1997, for details of beamforming with CDMA systems.

In the preferred embodiment the adaptive antenna array 11A at the BS 11 is provided with fixed beam SS antennas. In this approach the S-CDMA/FDMA channels can be directed at individual SSs. The isolation provided by the beamforming allows the CDMA spreading codes to be reused within the same cell, greatly increasing spectral efficiency. Beamforming is best suited to CDM rather than TDM channels. In the downstream, TDM would employ beamforming on a per slot or burst basis, increasing complexity. In the upstream, beamforming would be difficult since the BS 11 would need to anticipate transmission from the SS in order to form the beams appropriately. In either case, reuse of CDMA spreading codes in a TDM-only environment would be difficult. With CDM, however, the BS 11 may allocate bandwidth (i.e. CDMA channels) to the SS 10 based on need, or on SLAs. Once allocated, the BS 11 forms a beam to the SS 10 to maximize signal-to-interference ratios. Once the beam is formed, the BS 11 may allocate the same CDMA channel to one or more other SSs 10 in the cell. It is theoretically possible for the spectral efficiency of the cell to scale linearly with the number of antennas in the BS array 11A.

SDMA greatly favors the approach of fast circuit-switching over pure, TDM packet-switching in a CDMA environment. By fast circuit-switching, what is implied is that packet data services are handled using dedicated connections, which are allocated and terminated based on bandwidth requirements and/or SLAs. An important consideration when providing effective packet-services using this approach lies in the ability of the BS 11 to rapidly determine bandwidth needs, and to both allocate and terminate connections rapidly. With fast channel allocation and termination, SDMA combined with the low frequency reuse offered by S-CDMA is a preferred option, in terms of spectral efficiency, for FWA applications.

A discussion is now made of waveform specifications. The waveform includes the channel coding 22, scrambling 24, modulation 26 and pulse shaping and equalization functions 28 of the air interface, as depicted in FIG. 2. Also included are waveform control functions, including power and timing control. In the presently preferred PHY, each CDMA channel (i.e. spreading code) uses a common waveform, with the spreading factor dictating the data rate of the channel. This applies as well to the code hopping technique discussed below.

With regard to the Error Control Coding (ECC) function 22 of FIG. 2, the ECC is preferably high-rate and adaptive. High rate codes are used to maximize the spectral efficiency of BWA systems using S-CDMA systems that are code-limited. In code-limited systems, the capacity is limited by the code set cardinality rather than the level of the multi-user interference. Adaptive coding is preferred in order to improve performance in multipath fading environments. For the coding options, and referring as well to FIG. 3, the baseline code is preferably a punctured convolutional code (CC). The constituent code may be the industry standard, rate ½, constraint length 7 code with generator $(133/171)_8$. Puncturing is used to increase the rate of the code, with rates of ¾, ⅘, ⅚ or ⅞ supported using optimum free distance puncturing patterns. The puncturing rate of the code may be adaptive to mitigate fading conditions. For decoding (block 38 of FIG. 2), a Viterbi decoder is preferred. Reference in this regard can be made again to the above-noted publication R. De Gaudenzi and F. Gianneti, Analysis and Performance Evaluation of Synchronous Trellis-Coded CDMA for Satellite Applications, IEEE Transactions on Communications, Vol. 43, No. 2/3/4, February/March/April 1995, pp. 1400–1409, for an analysis of trellis-coded S-CDMA.

Turbo coding, including block turbo codes and traditional parallel and serial concatenated convolutional codes, are preferably supported as an option at the rates suggested above. In FIG. 3, the CC/Turbo coding is performed in block 22A, the puncturing in block 22B, and the scrambling can be performed using an XOR 24A that receives a randomizing code.

Each CDMA channel is preferably coded independently. Independent coding of CDMA channels furthers the symmetry of the upstream and downstream waveform and enables a similar time-slot structure on each CDMA channel. The upstream and downstream waveform symmetry aids in cost reduction, as the SS 10 and BS 11 baseband hardware can be identical. The independent coding of each S-CDMA/FDMA channel is an important distinction between this approach and other multi-carrier CDMA schemes.

Randomization is preferably implemented on the coded bit stream. Rather than using a traditional randomizing circuit, it is preferred, as shown in FIG. 3, to use randomizing codes derived from the spreading sequences used by the transmitting station. Using the spreading codes allows different randomizing sequences to be used by different users, providing more robust randomization and eliminating problems with inter-user correlated data due to periodic sequences transmitted (e.g. preambles). Since the receiving station has knowledge of the spreading codes, de-randomization is trivial. Randomization may be disabled on a per channel or per symbol basis. FIG. 3 thus depicts the preferred channel coding and scrambling method for a single CDMA channel.

With regard to the modulation block 26, both coherent QPSK and square 16-QAM modulation formats are preferably supported, with optional support for square 64-QAM. Using a binary channel coding technique, Gray-mapping is used for constellation bit-labeling to achieve optimum decoded performance. This combined coding and modulation scheme allows simple Viterbi decoding hardware designed for binary codes to be used. Differential detection for all modulation formats may be supported as an option. Depending on the channel coding, waveform spectral efficiencies from 1 to 6 information bits/symbol are realized.

The modulation format utilized is preferably adaptive based on the channel conditions and bandwidth requirements. Both upstream and downstream links are achievable using a QPSK waveform that provides adequate SNR. In environments with higher SNR, up and downstream links may utilize 16-QAM and/or 64-QAM modulation formats for increased capacity and spectral efficiency. The allowable modulation format depends on the channel conditions and the channel coding being employed on the link.

In the preferred embodiment, end-to-end raised-cosine Nyquist pulse shaping is applied by block 28 of FIG. 2, using a minimum roll-off factor of 0.25. Pulse shape filtering is designed to meet relevant spectral masks, mitigate inter-symbol interference (ISI) and adjacent FDMA channel interference.

To mitigate multipath fading, a linear equalizer 32 is preferred for the downstream. Equalizer training may be accomplished using a preamble, with decision-direction used following initial training. With S-CDMA, equalizing the aggregate signal in the downlink effectively equalizes all CDMA channels. Multipath delay spread of less than 3 µs is expected for Non-Line Of Sight (NLOS) deployments using narrow-beam (10–20°) subscriber station 10 antennas (see, for example, J. Porter and J. Thweat, Microwave Propagation Characteristics in the MMDS Frequency Band, Proceedings of IEEE International Conf. On Communications (ICC) 2000, New Orleans, La., USA, June 2000, and V. Erceg, et al, A Model for the Multipath Delay Profile of Fixed Wireless Channels, IEEE Journal on Selected Areas in Communications (JSAC), Vol. 17, No. 3, March 1999, pp. 399–410.

The low delay spread allows simple, linear equalizers with 8–16 taps that effectively equalize most channels. For the upstream, pre-equalization may be used as an option, but requires feedback from the subscriber station 10 due to frequency division duplexing.

Timing control is required for S-CDMA. In the downstream, timing control is trivial. However, in the upstream timing control is under the direction of the BS 11. Timing control results in reduced in-cell interference levels. While infinite in-cell signal to interference ratios are theoretically possible, timing errors and reduction in code-orthogonality from pulse shape filtering allows realistic signal to in-cell interference ratios from 30–40 dB. In asynchronous DS-CDMA (A-CDMA) systems, higher in-cell interference levels exist, less out-of-cell interference can be tolerated and higher frequency reuse is needed to mitigate out-of-cell interference(see, for example, T. Rappaport, *Wireless Communications: Principles and Practice*, Prentice-Hall PTR, Upper Saddle River, N.J., 1996, pp. 425–431. The ability of timing-control to limit in-cell interference is an important aspect of achieving a frequency reuse of one in a S-CDMA system.

Power control is also required for S-CDMA systems. Power control acts to mitigate in-cell and out-of-cell interference while also ensuring appropriate signal levels at the SS 10 or the BS 11 to meet bit error rate (BER) requirements. For a SS 10 close to the BS 11, less transmitted power is required, while for a distant SS 10, more transmit power is required in both the up and downstream. As with timing control, power control is an important aspect of achieving a frequency reuse of one.

Turning now to a discussion of capacity, spectral efficiency and data rates, for a single, spread FDMA channel, the presently preferred S-CDMA waveform is capable of providing channel bandwidths from 1 to 16 Mbps. Using variable-length spreading codes, each CDMA channel can be configured to operate from 32 kbps (SF=128) to 16 Mbps (SF=1), with rates depending on the modulation, coding and RF channel bandwidths. With S-CDMA channel aggregation, high data rates are possible without requiring a SF of one. In general, the use of S-CDMA along with the presently preferred interference mitigation techniques enable the system to be code-limited. Note, mobile cellular A-CDMA systems are always interference-limited, resulting in lower spectral efficiency. Recall also that in code-limited systems, the capacity is limited by the code set cardinality rather than the level of the multi-user interference. In a code-limited environment, the communications channel bandwidth of the system is equal to the communications channel bandwidth of the waveform, assuming a SF of one. In the Table shown in FIG. 4 sample parameters are shown for a hypothetical system using different coded modulation schemes and assuming a code-limited DS-CDMA environment. The Table of FIG. 4 illustrates potential performance assuming a single 3.5 MHz channel in both the upstream and downstream. The numbers reported apply to both the upstream and downstream directions, meaning that upwards of 24 Mbps full duplex is possible (12 Mbps upstream and 12 Mbps downstream). With additional FDMA RF channels or large RF channels (e.g. 6 MHz), additional communication bandwidth is possible with the same modulation factors from the Table. As an example, allocation of 14 MHz could be serviced using 4 FDMA RF channels with the parameters described in the Table of FIG. 4. At 14 MHz, peak data rates to a given SS 10 of up to 48 Mbps are achievable, with per-CDMA channel data rates scaling up from 32 kbps. The channel aggregation method in accordance with these teachings is very flexible in servicing symmetric versus asymmetric traffic, as well as for providing reserved bandwidth for QoS and SLA support.

With regard to multi-cell performance, to this point both the capacity and spectral efficiency have been discussed in the context of a single, isolated cell. In a multi-cell deployment, S-CDMA enables a true frequency reuse of one. With S-CDMA, there is no need for frequency planning, and spectral efficiency is maximized. With a frequency reuse of one, the total system spectral efficiency is equal to the modulation factor of a given cell. Comparing S-CDMA to a single carrier TDMA approach, with a typical frequency reuse of 4, TDMA systems must achieve much higher modulation factors in order to compete in terms of overall system spectral efficiency. Assuming no sectorization and a frequency reuse of one, S-CDMA systems can achieve system spectral efficiencies from 1 to 6 bps/Hz, with improvements being possible with SDMA.

While frequency reuse of one is theoretically possible for DS-CDMA, the true allowable reuse of a specific deployment is dependent on the propagation environment (path loss) and user distribution. For mobile cellular systems, it has been shown that realistic reuse factors range from 0.3 up to 0.7 for A-CDMA: factors that are still much higher than for TDMA systems. In a S-CDMA system, in-cell interference is mitigated by the orthogonal nature of the S-CDMA, implying that the dominant interference results from adjacent cells. For the fixed environments using S-CDMA, true frequency reuse of one can be achieved for most deployments using directional SS 10 antennas and up and downstream power control to mitigate levels of adjacent cell interference. In a S-CDMA environment, true frequency reuse of one implies that a cell is code-limited, even in the presence of adjacent cell interference.

For sectorized deployments with S-CDMA, a frequency reuse of two is preferred to mitigate the interference contributed by users on sector boundaries. In light of this reuse issue, it is preferred, but not required, to use SDMA with adaptive beamforming, rather than sectorization, to improve cell capacity. Since spectral efficiency translates directly into cost, the possibility of a frequency reuse of one is an important consideration.

The use of SDMA in conjunction with S-CDMA offers the ability to dramatically increase system capacity and spectral efficiency. SDMA uses the antenna array 11A at the BS 11 to spatially isolate same code SSs 10 in the cell. The number of times that a code may be reused within the same cell is dependent upon the number of antenna elements in the array 11A, the array geometry, the distribution of users in the cell, the stability of the channel, and the available processing power. Theoretically, in the absence of noise, with an M element antenna array 11A it is possible to reuse each code sequence M times, thereby increasing system capacity by a factor of M. In practice, the code reuse is slightly less than M due to implementation loss, frequency selective multipath fading, and receiver noise. Regardless, significant capacity gains are achievable with SDMA. With appropriate array geometry and careful grouping of users sharing CDMA codes, it is possible to achieve a code reuse of 0.9M or better.

In an actual deployment the number of antenna elements of the antenna array 11A is limited by the available processing power, the physical tower constraints, and system cost (e.g. the number of additional RF front ends (RFFEs)). Selected array sizes vary depending upon the required capacity of the given cell on a cell-by-cell basis. The Table shown in FIG. 5 illustrates the achievable aggregate capacity and modulation factor with typical array sizes, assuming a code reuse equal to the number of antenna elements. The aggregate capacity is defined as the total data rate of the BS 11. Modulation factors exceeding 56 bps/Hz are achievable with 64 QAM and a sixteen-element antenna array 11A. It should be noted that while SDMA increases the capacity of cell, it does not increase the peak data rate to a given SS 10.

The PHY system disclosed herein is very flexible. Using narrowband S-CDMA channels, the PHY system can adapt to frequency allocation, easily handling non-contiguous frequency allocations. The data multiplexing scheme allows great flexibility in servicing traffic asymmetry and support of traffic patterns created by higher-layer protocols such as Transmission Control Protocol (TCP) and Real Time Protocol (RTP).

Deployments using the disclosed PHY are also very scalable. When traffic demands increase, new frequency allocation can be used. This involves adding additional FDMA channels, which may or may not be contiguous with the original allocation. Without additional frequency allocation, cell capacity can be increased using the adaptive antenna array 11A and SDMA.

The high spectral efficiency of the disclosed waveform leads to cost benefits. High spectral efficiency implies less frequency bandwidth is required to provide a certain amount of capacity.

Using a symmetric waveform (i.e., a waveform that is the same in the upstream and downstream directions) is a cost saving feature, allowing the use of common baseband hardware in the SS 10 and the BS 11. The use of CDMA technology also aids in cost reduction, as some CDMA technology developed for mobile cellular applications may be applicable to gain economies of scale.

As a spread spectrum signal, the preferred waveform offers inherent robustness to interference sources. Interference sources are reduced by the spreading factor, which ranges from 1 to 128 (interference suppression of 0 to 21 dB.) At the SS 10, equalization further suppresses narrowband jammers by adaptively placing spectral nulls at the jammer frequency. Additional robustness to interference is achieved by the directionality of the SS antennas, since off-boresight interference sources are attenuated by the antenna pattern in the corresponding direction. At the BS 11, the antenna array 11A used to implement SDMA offers the additional benefit of adaptively steering nulls towards unwanted interference sources.

The presently preferred waveform exhibits several properties that make it robust to channel impairments. The use of spread spectrum makes the waveform robust to frequency selective fading channels through the inherent suppression of inter-chip interference. Further suppression of inter-chip interference is provided by equalization at the SS 10. The waveform is also robust to flat fading channel impairments. The adaptive channel coding provides several dB of coding gain. The antenna array 11A used to implement SDMA also functions as a diversity combiner. Assuming independent fading on each antenna element, diversity gains of M are achieved, where M is equal to the number of antenna elements in the antenna array 11A. Finally, since the S-CDMA system is code-limited rather than interference limited, the system may run with a large amount of fade margin. Even without equalization or diversity, fade margins on the order of 10 dB are possible. Therefore, multipath fades of 10 dB or less do not increase the BER beyond the required level.

The adaptive modulation also provides some robustness to radio impairments. For receivers with larger phase noise, the QPSK modulation offers more tolerance to receiver phase noise and filter group delay. The adaptive equalizer at the SS 10 reduces the impact of linear radio impairments. Finally, the use of clipping to reduce the peak-to-average power ratio of the transmitter signal helps to avoid amplifier saturation, for a given average power output.

An important distinction between the presently preferred embodiment and a number of other CDMA approaches is the use of a synchronous upstream, which allows the frequency reuse of one. Due to some similarity with mobile cellular standards, cost savings are possible using existing, low-cost CDMA components and test equipment.

The presently preferred PHY system is quite different from cable modem and xDSL industry standards, as well as existing IEEE 802.11 standards. With a spreading factor of one chip/symbol, the PHY supports a single-carrier QAM waveform similar to DOCSIS 1.1 and IEEE 802.16 draft PHY (see Data-Over-Cable Service Interface Specifications: Radio Frequency Interface Specification, SP-RF 1v1.1-I05-

000714, and IEEE 802.16.1-00/01r4, Air Interface for Fixed Broadband Wireless Access Systems, September 2000.)

The presently preferred PHY technique provides an optimum choice for IEEE 802.16A and for other applications. An important aspect of the PHY is its spectral efficiency, as this translates directly to cost measured in cost per line or cost per carried bit for FWA systems. With a frequency reuse of one and efficient support of SDMA for increased spectral efficiency, the combination of S-CDMA with FDMA is an optimum technology for the fixed wireless access market.

Benefits of the presently preferred PHY system include:
High spectral efficiency (1–6 bps/Hz system-wide), even without SDMA;
Compatibility with smart antennas (SDMA), with system-wide spectral efficiency exceeding 20 bps/Hz possible; and
A frequency reuse of one is possible (increased spectral efficiency and no frequency planning).

The use of S-CDMA provides robustness to channel impairments (e.g. multipath fading): robustness to co-channel interference (allows frequency reuse of one); and security from eavesdropping.

Also provided is bandwidth flexibility and efficiency support of QoS requirements, flexibility to support any frequency allocation using a combination of narrowband S-CDMA combined with FDMA, while adaptive coding and modulation yield robustness to channel impairments and traffic asymmetries.

The use of these teachings also enables one to leverage mobile cellular technology for reduced cost and rapid technology development and test. Furthermore, cost savings are realized using the symmetric waveform and identical SS 10 and BS 11 hardware.

Having thus described the overall PHY system, a discussion will now be provided in greater detail of an aspect thereof that is particularly pertinent to these teachings. FIG. 7 illustrates a frame structure that is suitable for practicing this invention. The frame structure depicted is one taken from commonly assigned U.S. Pat. No. 5,966,373, Waveform and Frame Structure for a Fixed Wireless Loop Synchronous CDMA Communications System, P. L. Stephenson, T. R. Giallorenzi, J. M. Harris, L. A. Butterfield, M. J. Hurst, D. M. Griffin and R. K. Thompson, incorporated by reference herein in its entirety. In this example data and control messages are contained in 16 ms frames 80, each containing four, 16-byte blocks of data fields 80A and three 1-byte control blocks or fields 80B. A single control message frame 82 includes a plurality of one byte fields. Each data frame 80 begins with a 1-byte synchronization (SYNC) word 80C.

FIG. 8 shows a PN code table 50 with different ones of the users indexed into the table 50 and offset from one another, wherein the users' indices into the table are moved in unison so as to hop from code to code, with each user within the cell operating for a predetermined period of time with a different spreading PN spreading code. The code table 50 is stored in each SS 10, as well as in the BS 11. Each user is given a different starting address or location in the code table 50, and thereafter their respective indices into the table 50 are moved or shifted in unison at some rate, such as the symbol rate or a multiple of the symbol rate. The result is that each SS 10 operates with a different spreading code. The index into the table 50 can be driven by a finite state machine (FSM) 52, or by any suitable technique, such as a simple binary counter. In this case each counter could be preloaded with a different starting value and then subsequently incremented together, thereby assuring that no two subscriber stations 10 within the cell would simultaneously use the same PN spreading code. In that the SS 10 and the BS 11 operate synchronously, the BS 11 shifts its indices (one corresponding to each active SS 10) in synchronism with the SSs 10. A sequential round robin technique can be used, or a pseudo-random hopping technique can be used, or any suitable technique for ensuring that at any given time each SS 10 operates with a spreading code that differs from the spreading code being used by other active SSs 10 in the cell. Preferably adjacent cells use other code sets, and their hopping patterns may differ as well.

In accordance with an aspect of the PN code hopping technique those PN codes used for random access and control channels can be omitted from the hopping sequence, enabling these non-hopped codes to be more rapidly acquired. In other words, the codes found in the table 50 maybe a sub-set of the complete set of codes for the cell, where the remaining non-hopped codes are used for random access and/or control channel purposes. It is also within the scope of these teachings to reserve some non-hopped codes for other purposes. In addition, the all one's code can be used in the table 50 as one of the sub-set of hopped PN codes. Since a given user operates with the all one's code for but a short period of time, such as the duration of one symbol or one small block, the potential signal degradation due to adjacent cell interference and any DC biasing problems are infrequent, and can easily be corrected using conventional error control techniques.

Figure 9:
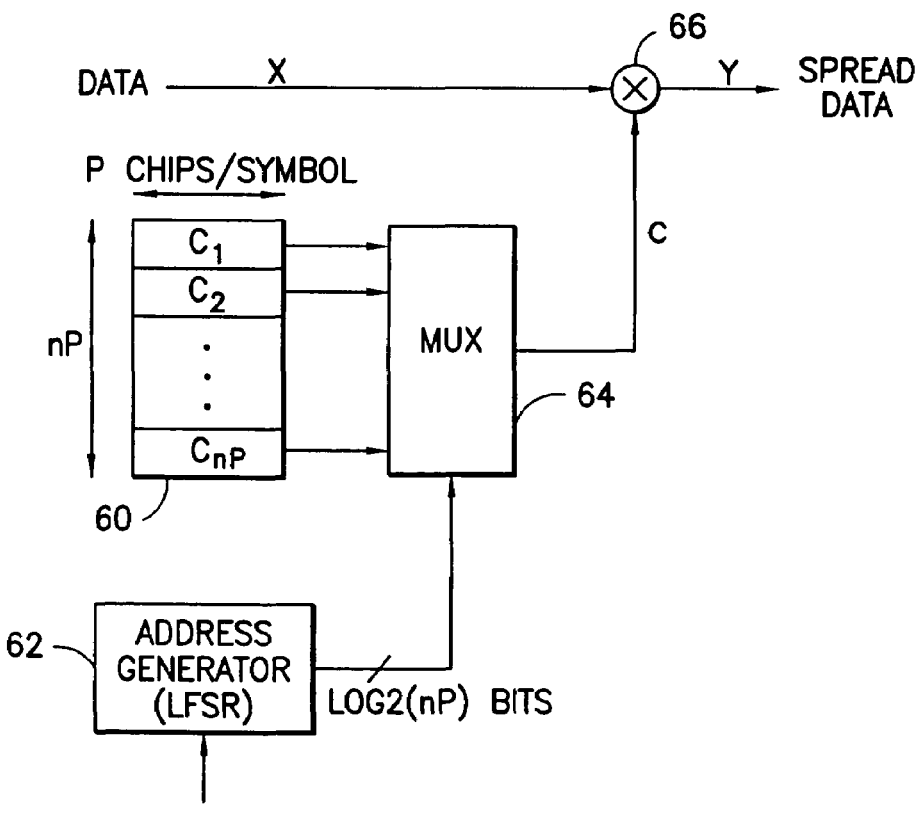
FIG. 9 shows an embodiment of circuitry for implementing PN code hopping in the DS-CDMA system.

FIG. 9 shows an example of circuitry 60 for implementing the code hopping technique in accordance with this invention. A base code set 62, such as a memory device, contains all base code vectors ($c_1$). It is assumed that the set is constructed from orthogonal designs with the code vectors of sets ($c_1 \ldots c_p$), ($c_{p+1} \ldots c_{2p}$), $\ldots$, ($c_{(n-1)p+1} \ldots c_{np}$) being mutually orthogonal. The motivation for code sets constructed from mutually orthogonal designs arises from the need to mitigate adjacent cell interference. An address generator 62, which can be implemented with a LFSR or a RAM, is clocked at the hopping rate of the codes and what is output from a multiplexer (MUX) 64 is a 1×P vector of chips to modulate (or spread) the data. The spreading function is accomplished by the multiplier 66. In order to hop the codes every symbol, the address generator 62 is clocked at the symbol rate of the transmission. The address generator 62 is preferably designed such that collisions (i.e., two users using the same code) are avoided. A simplest implementation of code hopping is to use sequential hopping, where the address generator 62 is implemented with an up/down counter seeded by an integer 0 . . . P−1. Every user is given a unique seed value to avoid collisions.

The code hopping technique, unlike the use of the long cover code, preserves the balance of the codes, thereby reducing DC bias problems in the receiver, and furthermore reclaims the all one's code, thereby increasing system capacity.

In a fixed rate DS-CDMA system all users spread with a fixed spreading gain P chips/symbol. In this case the use of code hopping is as was described above: the code set is partitioned into hopped and non-hopped codes, and a code hopping pattern and hop duration are specified. The hop duration may be at the symbol rate (chipping rate/P) or it may be for multiple symbols. Hopping in the middle of symbols is not preferred, as the orthogonality of the users would be compromised. Thus, preferably the hops between spreading codes are made at a symbol boundary of all of the subscriber stations 10. Upon link establishment a user is assigned to a hopped code and is given an initial seed or phase of the hopping pattern, and then begins transmission. The initial phase is one sufficient for both the transmitter and the receiver to be able to correctly recover (despread) the data.

For the case of variable rate DS-CDMA systems, users operate with a fixed chipping rate, but can choose spreading codes with differing spreading gains in order to achieve different symbol rates. Typically a minimum spreading gain is specified, such as $P_{min}$ of 8 or 16, along with a maximum spreading gain $P_{max}=nP_{min}$. A variable rate spreading code set is constructed from a base code set having $P_{min}$ codes. Variable rate spreading code sets can be constructed using this base code set via recursive techniques or non-recursive techniques. In either construction a single base code set with $P_{mm}$ chips/symbol will form two orthogonal code sets with $2 P_{min}$ chips/symbol, four orthogonal code sets with $4 P_{min}$ chips/symbol, and so forth. The base code or parent is present in each of the codes with higher spreading gain.

For code hopping applied to variable rate CDMA, the most straightforward hopping approach is for users to hop at the symbol rate, or at a multiple of the symbol rate of the lowest symbol rate (or highest spreading gain). In this approach a user with a spreading gain of $P_{max}$ uses a code for k=1, 2, ... etc. symbols, while a user using a code at $P_{min}$ uses the code for kn symbols, where $P_{max}=nP_{min}$. With this hopping technique, orthogonality is preserved, but users with small spreading gain are forced to hop codes at a slower rate than user's with larger spreading gains.

It can be shown as well by inspection of the variable code rate sets that code hopping can be done at the symbol rate of the lowest spreading gain users without changing the orthogonality of the users. This is true for both recursive and non-recursive code constructions, and results from the fact that the codes in the base code set with $P_{min}$ form the codes with the higher spreading gain.

While described above primarily in the context of a synchronous DS-CDMA system, it should be realized that these teachings can be applied as well to asynchronous CDMA systems. Furthermore, while described in the context of various exemplary modulation and channel coding formats, frequencies, numbers of antenna elements, spreading factors, symbol rates and the like, it should further be realized that these are exemplary, and are not to be construed in a limiting sense upon the practice of this invention.

Thus, while these teachings have been particularly shown and described with respect to preferred embodiments thereof, it will be understood by those skilled in the art that changes in form and details may be made therein without departing from the scope and spirit of the invention described above.

What is claimed is:

1. A method for operating a code division multiple access communications system, comprising:

assigning a hopped sub-set of a first set of spreading codes and a first hop sequence to individual ones of a plurality of subscriber stations within a first cell;

during transmissions within a the first cell, periodically hopping amongst individual ones of the spreading codes of the hopped sub-set of the first set of spreading codes according to the first hop sequence and further comprising assigning a non-hopped sub-set of the first set of spreading codes to individual ones of said plurality of subscriber stations for use on a system access channel;

assigning a hopped sub-set of a second set of spreading codes and a second hop sequence to individual ones of a plurality of subscriber stations within a second cell adjacent to the first cell; and during transmissions within the second cell, periodically hopping amongst individual ones of the spreading codes of the hopped sub-set of the second set of spreading codes according to the second hop sequence;

such that at any given time no two subscriber stations of the first or adjacent cell operate with the same spreading code.

2. A method for operating a code division multiple access communications system, comprising:

assigning a hopped sub-set of a first set of spreading codes and a first hop sequence to individual ones of a plurality of subscriber stations within a first cell;

during transmissions within the first cell, periodically hopping amongst individual ones of the spreading codes of the hopped sub-set of the first set of spreading codes according to the first hop sequence and further comprising assigning a non-hopped sub-set of the first set of spreading codes to individual ones of said plurality of subscriber stations for use on a system control channel;

assigning a hopped sub-set of a second set of spreading codes and a second hop sequence to individual ones of a plurality of subscriber stations within a second cell adjacent to the first cell; and during transmissions within the second cell, periodically hopping amongst individual ones of the spreading codes of the hopped sub-set of the second set of spreading codes according to the second hop sequence;

such that at any given time no two subscriber stations of the first or adjacent cell operate with the same spreading code.

3. A method for operating a code division multiple access communications system, comprising:

assigning a hopped sub-set of a first set of spreading codes and a first hop sequence to individual ones of a plurality of subscriber stations within a first cell;

during transmissions within the first cell, periodically hopping amongst individual ones of the spreading codes of the hopped sub-set of the first set of spreading codes according to the first hop sequence and further comprising assigning a non-hopped sub-set of the first set of spreading codes to individual ones of said plurality of subscriber stations for use on a non-traffic channel;

assigning a hopped sub-set of a second set of spreading codes and a second hop sequence to individual ones of a plurality of subscriber stations within a second cell adjacent to the first cell; and during transmissions within the second cell, periodically hopping amongst individual ones of the spreading codes of the honned sub-set of the second set of spreading codes according to the second hop sequence;

such that at any given time no two subscriber stations of the first or adjacent cell operate with the same spreading code.

4. A method for operating a code division multiple access communications system, comprising:

assigning a hopped sub-set of a first set of spreading codes and a first hop sequence to individual ones of a plurality of subscriber stations within a first cell;

during transmissions within a the first cell, periodically hopping amongst individual ones of the spreading codes of the hopped sub-set of the first set of spreading codes according to the first hop sequence;

assigning a hopped sub-set of a second set of spreading codes and a second hop sequence to individual ones of a plurality of subscriber stations within a second cell adjacent to the first cell; and during transmissions within the second cell, periodically hopping amongst individual ones of the spreading codes of the hopped sub-set of the second set of spreading codes according to the second hop sequence;

such that at any given time no two subscriber stations of the first or adjacent cell operate with the same spreading code, wherein the step of periodically hopping changes from a currently used spreading code to a next spreading code at a symbol rate or at a multiple of the symbol rate.

5. A method as in claim 4, wherein the spreading codes comprise orthogonal, Walsh-Hadamard codes having a variable spreading factor.

6. A method for operating a code division multiple access communications system, comprising:

assigning a hopped sub-set of a first set of spreading codes and a first hop sequence to individual ones of a plurality of subscriber stations within a first cell;

during transmissions within a the first cell, periodically hopping amongst individual ones of the spreading codes of the hopped sub-set of the first set of spreading codes according to the first hop sequence;

assigning a hopped sub-set of a second set of spreading codes and a second hop sequence to individual ones of a plurality of subscriber stations within a second cell adjacent to the first cell; and during transmissions within the second cell, periodically hopping amongst individual ones of the spreading codes of the hopped sub-set of the second set of spreading codes according to the second hop sequence;

such that at any given time no two subscriber stations of the first or adjacent cell operate with the same spreading code, wherein the system is a variable data rate system and wherein the step of periodically hopping changes from a currently used spreading code to a next spreading code at the symbol rate or at a multiple of the symbol rate of one of the lowest symbol rate users.

7. A method for operating a code division multiple access communications system, comprising:

within a coverage area of a base station, assigning a set of spreading codes to individual ones of a plurality of subscriber stations; and during transmissions within a cell, periodically hopping amongst individual ones of the spreading codes of the set of spreading codes such that at any given time no two subscriber stations operate with the same spreading code, wherein the system is a variable data rate system and wherein the step of periodically hopping changes from a currently used spreading code to a next spreading code at the symbol rate, or at a multiple of the symbol rate of the lowest spreading gain users.

8. A code division multiple access communications system, comprising a controller operating within a coverage area of a base station first cell for assigning a hopped sub-set of a first set of spreading codes to individual ones of a plurality of subscriber stations; and further comprising circuitry that is responsive to transmissions within the first cell for periodically hopping amongst the hopped sub-set of the first set of spreading codes according to a first hop sequence and where said controller further assigns a non-hopped sub-set of the first of spreading codes to individual ones of said plurality of subscriber stations for use on a system access channel;

said controller further coordinating with a base station second cell, adjacent to said first cell, by which a plurality of subscriber stations periodically hop amongst a hopped sub-set of a second set of spreading codes according to a second hop sequence, such that at any given time no two subscriber stations of either the first or second cell operate with the same spreading code.

9. A code division multiple access communications system, comprising a controller operating within a coverage area of a base station first cell for assigning a hopped sub-set of a first set of spreading codes to individual ones of a plurality of subscriber stations; and further comprising circuitry that is responsive to transmissions within the first cell for periodically hopping amongst the hopped sub-set of the first set of spreading codes according to a first hop sequence, and where said controller further assigns a non-hopped sub-set of the first set of spreading codes to individual ones of said plurality of subscriber stations for use on a system control channel;

said controller further coordinating with a base station second cell, adjacent to said first cell, by which a plurality of subscriber stations periodically hon amongst a hopped sub-set of a second set of spreading codes according to a second hop sequence, such that at any given time no two subscriber stations of either the first or second cell operate with the same spreading code.

10. A code division multiple access communications system, comprising a controller operating within a coverage area of a base station first cell for assigning a hopped sub-set of a first set of spreading codes to individual ones of a plurality of subscriber stations; and further comprising circuitry that is responsive to transmissions within the first cell for periodically hopping amongst the hopped sub-set of the first set of spreading codes according to a first hop sequence, and where said controller further assigns a non-hopped sub-set of the first set of spreading codes to individual ones of said plurality of subscriber stations for use on a non-traffic channel;

said controller further coordinating with a base station second cell, adjacent to said first cell, by which a plurality of subscriber stations periodically hop amongst a hopped sub-set of a second set of spreading codes according to a second hop seguence, such that at any given time no two subscriber stations of either the first or second cell operate with the same spreading code.

11. A code division multiple access communications system, compnsing a controller operating within a coverage area of a base station first cell for assigning a hopped sub-set of a first set of spreading codes to individual ones of a plurality of subscriber stations; and further comprising circuitry that is responsive to transmissions within the first cell for periodically hopping amongst the hopped sub-set of the first set of spreading codes according to a first hop sequence;

said controller further coordinating with a base station second cell, adjacent to said first cell, by which a plurality of subscriber stations periodically hov amongst a hopped sub-set of a second set of spreading codes according to a second hop sequence, such that at any given time no two subscriber stations of either the first or second cell operate with the same spreading code, wherein said circuitry changes from a currently used spreading code to a next spreading code at a symbol rate or at a multiple of the symbol rate.

12. A code division multiple access communications system, comprising a controller operating within a coverage area of a base station first cell for assigning a hopped sub-set of a first set of spreading codes to individual ones of a plurality of subscriber stations; and further comprising circuitry that is responsive to transmissions within the first cell for periodically hopping amongst the hovved sub-set of the first set of spreading codes according to a first hop sequence;

said controller further coordinating with a base station second cell, adjacent to said first cell, by which a plurality of subscriber stations periodically hop amongst a hopped sub-set of a second set of spreading codes according to a second hop sequence, such that at any given time no two subscriber stations of either the first or second cell operate with the same spreading code, wherein the system is a variable data rate system and wherein the step of periodically hopping changes from a currently used spreading code to a next spreading code at the symbol rate or at a multiple of the symbol rate of the lowest symbol rate users.

13. A code division multiple access communications system, comprising a controller operating within a coverage area of a base station for assigning a set of spreading codes to individual ones of a plurality of subscriber stations; and further comprising circuitiy that is responsive to transmissions within a cell for periodically hopping amongst the set of spreading codes such that at any given time no two subscriber stations operate with the same spreading code, wherein the system is a variable data rate system and wherein the step of periodically hopping changes from a currently used spreading code to a next spreading code at the symbol rate; or at a multiple of the symbol rate of the lowest spreading gain users.

14. A synchronous, direct sequence code division multiple access communications system, comprising a controller operating within a coverage area of a base station first cell for assigning a hopped sub-set of a first set of spreading codes to individual ones of a plurality of subscriber stations within the first cell; and further comprising circuitry that is responsive to transmissions within the first cell for periodically hopping amongst the sub-set of the first set of spreading codes at a symbol rate or a multiple of a symbol rate, wherein said controller further assigns a non-hopped sub-set of the first set of spreading codes to individual ones of said plurality of subscriber stations within the first cell for use on at least one of a system access channel or a system control channel;

said controller further coordinating with a base station second cell, adjacent to said first cell, by which a plurality of subscriher stations within the second cell periodically hop amongst a hopped sub-set of a second set of spreading codes according to a second hop sequence, such that at any given time no two subscriber stations of either the first or second cell operate with the same spreading code.

15. A system as in claim 14, wherein the set of spreading codes comprises an all ones spreading code.

16. A system as in claim 14, wherein the system operates as one of a fixed data rate system and a variable data rate system.

17. A system as in claim 14, wherein the hops between spreading codes are made at a symbol boundary of all of the subscriber stations within the first cell.

18. A system as in claim 14, wherein said first set of spreading codes comprise orthogonal, Walsh-Hadamard codes having a variable spreading factor.

* * * * *

UNITED STATES PATENT AND TRADEMARK OFFICE
CERTIFICATE OF CORRECTION

PATENT NO. : 7,099,372 B2
APPLICATION NO. : 10/037422
DATED : August 29, 2006
INVENTOR(S) : Nieczyporowicz et al.

It is certified that error appears in the above-identified patent and that said Letters Patent is hereby corrected as shown below:

IN THE CLAIMS:

Claim 3, col. 16, line 53, delete "honed" and insert --hopped--.

Claim 4, col. 16, line 63, delete "a".

Claim 6, Col. 17, line 23, delete "a".

Claim 8, Col. 18, line 1, after "first" insert --set--.

Claim 9, Col. 18, line 26, delete "hon" and insert --hop--.

Claim 11, Col. 18, line 62, delete "hov" and insert --hop--.

Claim 12, Col. 19, line 10, delete "hovved" and insert --hopped--.

Claim 13, Col. 19, line 29, delete "circuitiy" and insert --circuitry--.

Signed and Sealed this

Fifth Day of December, 2006

JON W. DUDAS
*Director of the United States Patent and Trademark Office*